Oct. 7, 1947.  N. MONG  2,428,430
SELVAGE TRIMMER
Filed Jan. 26, 1946   2 Sheets-Sheet 1

INVENTOR.
Nicholas Mong
BY
Evans & McCoy
ATTORNEYS

Oct. 7, 1947.    N. MONG    2,428,430
SELVAGE TRIMMER
Filed Jan. 26, 1946    2 Sheets-Sheet 2

INVENTOR.
Nicholas Mong
BY
Evans + McCoy
ATTORNEYS

Patented Oct. 7, 1947

2,428,430

UNITED STATES PATENT OFFICE 2,428,430

SELVAGE TRIMMER

Nicholas Mong, Akron, Ohio, assignor to The General Tire & Rubber Company, Akron, Ohio, a corporation of Ohio Application January 26, 1946, Serial No. 643,766

10 Claims. (Cl. 164—36)

This invention relates to edge trimmers for removing excess rubber from an edge of a rubber coated fabric strip and particularly to a device for trimming the edges of rubberized fabric on a calender roll.

The present invention has for its object to provide a trimmer that will automatically follow the edge of a traveling fabric strip and trim off coating material that projects beyond the edge of the fabric.

More specifically the invention comprises a trimmer for a fabric coating rubber calender which has a blade mounted for free lateral movements and held by gravity in an operative position such that a lateral thrust is exerted thereon by the rubber being severed by the blade in a direction to press a side of the blade against the edge of the fabric strip and hold the blade against the edge of the fabric during operation, and which is sufficiently sensitive to accurately follow the edge of the fabric strip.

A further object of the invention is to provide a trimmer that is so constructed and so mounted with respect to a calender that it can be quickly and easily shifted into and out of operative position and does not require accurate setting to perform its functions.

With the above and other objects in view, the invention may be said to comprise the trimmer as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which.

Figure 1:
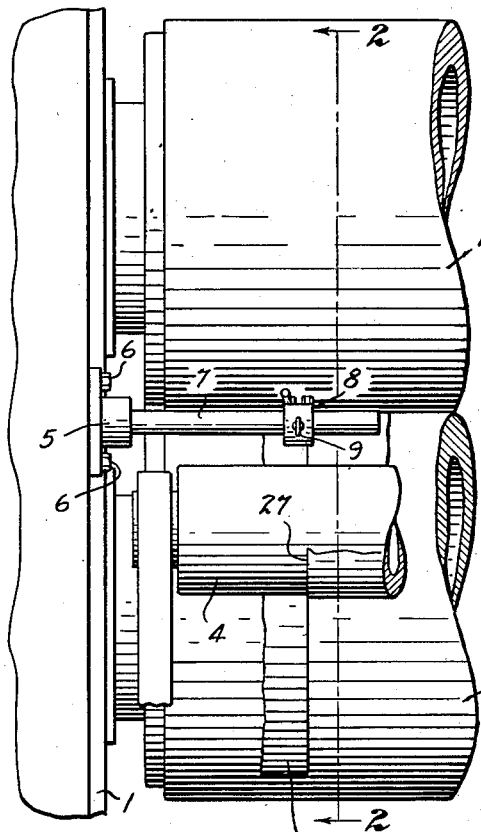
Figure 1 is a fragmentary rear elevation of a calender with the trimmer of the present invention mounted thereon.
Figure 2:
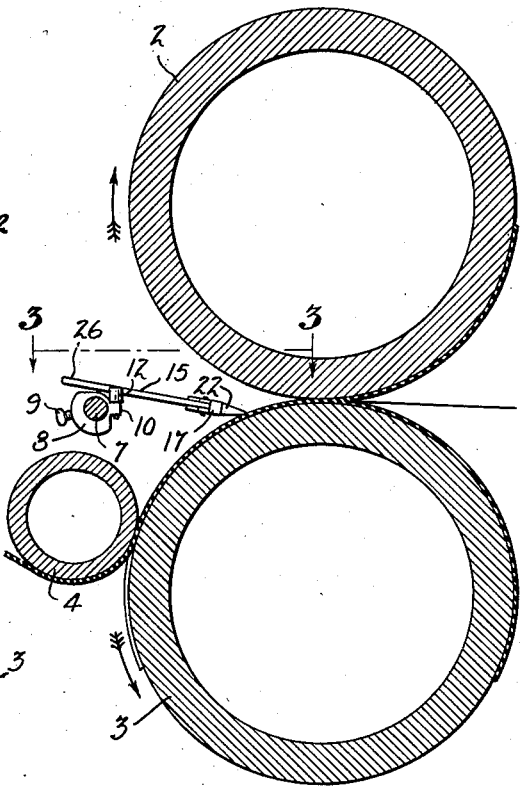
Fig. 2 is a fragmentary vertical section through the calender taken on the line indicated at 2—2 in Fig. 1 and showing the trimmer in side elevation.
Figure 3:
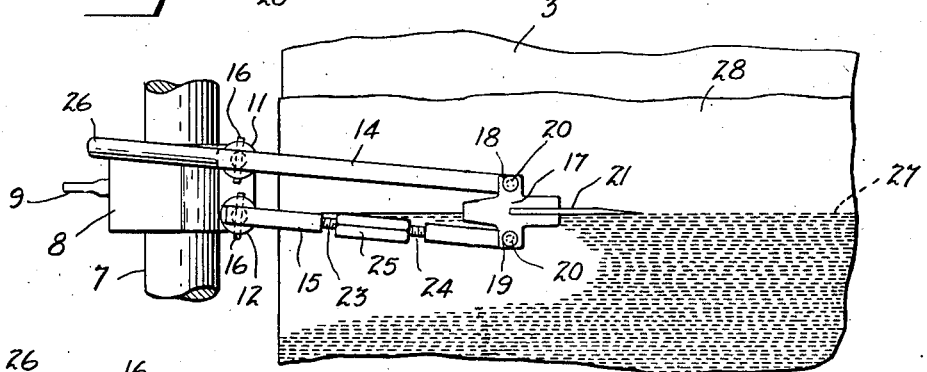
Fig. 3 is a top plan view of the trimmer and the bottom calender roll viewed as indicated at 3—3 in Fig. 2 and shown on a scale larger than the scale of Fig. 2.
Figure 4:
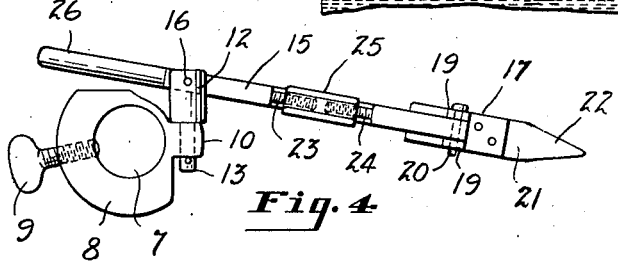
Fig. 4 is a side elevation of the trimmer on the same scale as Fig. 3.

The trimmer of the present invention is shown applied to a calender for applying a coating of rubber to fabric, only a fragment of the calender being shown, the portion of the calender shown comprising a standard 1 of the supporting frame and two superposed pressure applying rolls 2 and 3. The rolls 2 and 3 are the rolls of the calender between which the fabric and rubber are pressed and the rubberized fabric strip after passing through the bight of the rolls 2 and 3 travels upon the upper portion of the roll 3 rearwardly of the bight to a suitable take-off roll 4 from which the fabric passes to a suitably take-off mechanism not shown. Rearwardly of the bight between the rolls 2 and 3, a bracket 5 is attached to the standard 1 by suitable means such as bolts 6 and the bracket 5 provides a support for a horizontal shaft 7 that is disposed parallel to the axes of the calender rolls. It is to be understood that shaft 7 is supported at its opposite end by another bracket such as 5 on the opposite standard of the calender.

A supporting member 8 is slidably mounted upon the shaft 7 and is provided with a set screw 9 by means of which it may be secured in different positions of adjustment longitudinally of the shaft 7. The supporting member 8 carries a forwardly projecting flange 10 in which are mounted spaced pivot members 11 and 12 that are mounted to turn about substantially upright axes in the flange 10 by means of depending pintle portions 13 of reduced diameter that are journaled in the flange 10. The axes of the pivot members 11 and 12 are parallel and lie in a plane parallel to the axis of the calender roll 3. The upper ends of the pivot members 12 are channeled to receive links 14 and 15, each link being connected to its pivot member by means of a horizontal pivot 16. At their forward free ends the links 14 and 15 carry a head 17 that is provided on opposite sides with projecting lugs 18 and 19 that are connected to the links 14 and 15 by substantially upright pivots 20. The pivots 20 are spaced apart the same distance as the upright axes of the pivot members 11 and 12 and the pivot members 20 are at substantially equal distances from the pivot members 11 and 12 so that the links 14 and 15 are held in substantially parallel relation during their lateral swinging movements about the axes of the pivot members 11 and 12 and so that the angular position of the head 17 is substantially unchanged during such lateral movements.

A trimmer blade 21 is attached to the head 17 and this blade is so positioned that it is disposed in a plane substantially perpendicular to the axis of the calender roll 3. Since the angular position of the head 17 is not changed during lateral movements, the blade 21 will remain substantially at right angles to the axis of the roll 3 during such movements. The blade 21 has a V-shaped cutting portion 22 at its forward end providing a cutting edge that is disposed in a plane at right angles to the axis of the roll 3. The V-shaped forward end of the blade 21 may be sharpened along both angularly disposed edges to provide a blade that is reversible.

One of the links may be provided with means for varying its effective length. As shown the link 15 is composed of sections provided with threaded ends 23 and 24 that are engaged by a turnbuckle 25 which when turned in one direction shortens the link 15 and when turned in the opposite direction lengthens the link. One of the links may be extended rearwardly beyond the pivot member 11 to provide a handle 26 by means of which the trimmer blade may be shifted laterally to properly position it with respect to the fabric being trimmed.

During operation the supporting member 8 is so positioned upon the shaft 7 that the pivots 11 and 12 of the links 14 and 15 are nearer the end of the roll 3 than the pivots 20 connecting the head 17 to the links, so that when the blade is positioned against the edge of the fabric 27, the thrust of the rubber selvage extending past the edge of the fabric 27 will press the blade 21 laterally against the edge of the fabric and the fabric 27 bearing at its edge against a side of the blade 21 will resist inward movement of the blade sufficiently to cause the blade to follow the edge of the fabric. By properly adjusting the supporting member 8 on the shaft 7 the thrust of the rubber against the blade may be so regulated that the blade will follow the contour of the edge of the fabric strip without cutting into the fabric. By adjusting the turnbuckle 25 the angular position of the blade 21 with respect to the fabric may be slightly altered, as may be sometimes desirable to cause the blade to accurately follow the edge of the fabric as the fabric is moved endwise over the calender roll.

Figure 5:
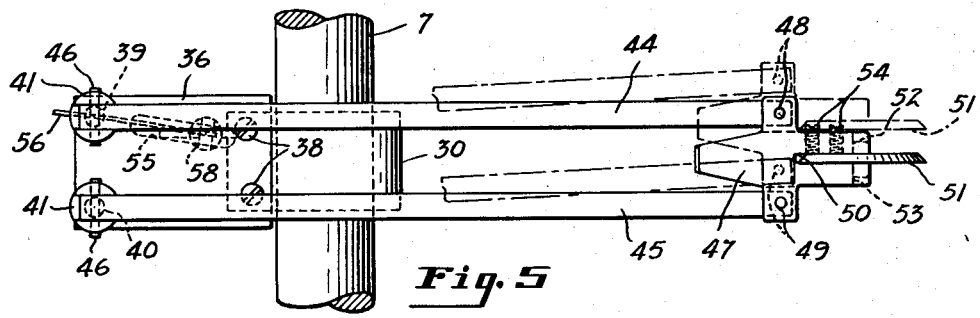
Fig. 5 is a plan view of another form of trimmer embodying the invention.
Figure 6:
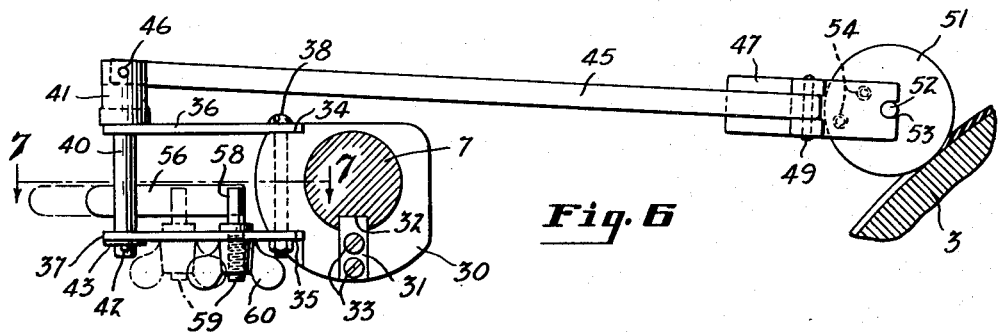
Fig. 6 is a side elevation of the trimmer shown in Fig. 5.
Figure 7:
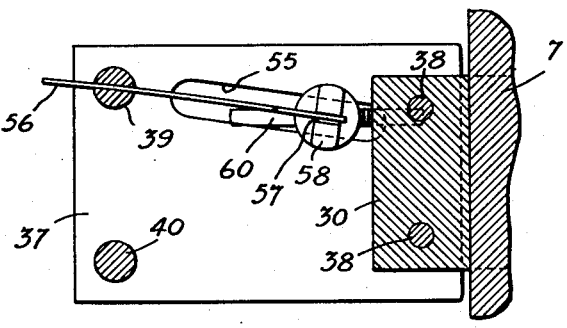
Fig. 7 is a fragmentary section taken on the line indicated at 7—7 in Fig. 6.

In Figs. 5, 6 and 7 of the drawings a supporting member 30 is slidably mounted on the stationary supporting shaft 7 and is held against turning movements on the shaft by means of a suitable key 31 fitting in a slot 32 in the shaft. The key 31 may be in the form of a metal strip secured to an end face of the supporting member by means of screws 33. On the rear side thereof the member 30 has upper and lower rabbets forming shoulders 34 and 35 to which upper and lower plates 36 and 37 are attached by means of bolts 38. The plates 36 and 37 provide supports for two laterally spaced vertical pivot pins 39 and 40 that are supported by heads 41 engaging the upper plate 36 and that are held in place by means of pins 42 and washers 43 beneath the lower plate 37. Two parallel links 44 and 45 are connected by horizontal pivots 46 to the heads 41 and extend forwardly across the shaft 7. The forward ends of the links 44 and 45 are connected to a head 47 by means of pivot pins 48 and 49 that are substantially parallel to the vertical pivot pins 39 and 40. The head 47 projects forwardly beyond the pivots 48 and 49 and is provided with a vertical slot 50 to receive a disk shaped cutter 51. The cutter 51 is provided with a beveled peripheral cutting edge and has an axle 52 that engages in transverse notches 53 on opposite sides of the slot 50 which serve to position the cutter. The cutter is held in place in the head 47 by means of set screws 54 which clamp the cutter against a side face of the slot 50. The parallel link connection between the head 47 and the supporting member serves to maintain the cutter 51 in a plane substantially at right angles to the axis of the calender roll. The cutter 51 has a continuous peripheral cutting edge, any portion of which may be adjusted to cutting position by loosening the screws 54 and turning the cutter about its axis to bring the desired portion of the cutting edge to work engaging position.

The plate 37 is provided with a slot 55 disposed at a small angle of inclination to its side edge and disposed radially with respect to the pivot pin 39. The pin 39 has a flat spring 56 attached thereto which is freely slidable in a diametrical slot 57 in a holder 58 that is mounted for adjustment in the slot 55. The holder 58 has a stem 59 which projects through the slot and which is threaded to receive a wing nut 60 by which the holder is secured in adjusted positions in the slot. The flat spring 56 which is fixed at one end to the pivot 39, is bent by the pivot 39 upon an angular movement of the pivot pin so that it yieldably resists lateral swinging movements of the cutter supporting arm. By adjusting the holder 58 toward or away from the pivot 39 the deflection characteristics of the spring may be changed to increase or decrease the resistance to lateral movement of the cutter.

The holder 58 is preferably so positioned that the spring 56 is unstressed when the links 44 and 45 are at right angles to the shaft 7, as shown in full lines in Fig. 5, and the carrier 30 is so positioned on the shaft that the cutter 51 must be swung laterally a short distance to bring it to the edge of the fabric from which the rubber selvage is to be trimmed. The cutter 51 is flat on the side which engages the edge of the fabric and the spring 56 exerts a slight pressure on the cutter to hold it in engagement with the edge of the fabric. By properly adjusting the spring 56 and the supporting members 30 the pressure of the cutter against the edge of the fabric may be so regulated that the cutter will accurately follow the fabric edge and trim off the selvage rubber as the fabric passes from the calender.

It is to be understood that variations and modifications of the specific devices herein shown and described for purposes of illustration, may be made without departing from the spirit of the invention.

What I claim is:

1. A device for trimming excess rubber from an endwise traveling strip of fabric coated with rubber comprising a stationary support, a frame attached to said support to swing laterally and vertically and movable by gravity toward said traveling strip, said frame comprising parallel links, a head carried by the links at their outer ends and substantially upright pivots connecting said links to said heads and to said support whereby said head may be moved laterally substantially without change in angular position, and a trimmer blade attached to said head and positioned substantially parallel to the edge to be trimmed.

2. A device for trimming excess rubber from an endwise traveling strip of rubber coated fabric carried upon the upper portion of a calender roll comprising a stationary support adjacent the upper portion of the roll on the side of the roll toward which the top of the roll is moving, a frame attached to said support to swing laterally and vertically and movable by gravity toward said roll, said frame comprising parallel links mounted to swing laterally about parallel axes adjacent their inner ends and a head connected by parallel pivots to the free ends of said links whereby said head may move laterally without substantial change in angular position, and a trimmer blade attached to said head and positioned substantially parallel to the edge of the fabric strip on the roll.

3. A device for trimming an edge of an endwise traveling strip of rubber coated fabric comprising a stationary support, a pair of spaced substantially upright pivots carried by said support, two substantially parallel links connected to said pivots to swing about substantially horizontal axes, a head carried by the free ends of said links and connected to the links by substantially upright pivots spaced apart substantially the same distance as the upright pivots on the stationary support, and a trimmer blade attached to said head and positioned substantially parallel to the edge to be trimmed.

4. A device for trimming an edge of an endwise traveling strip of rubber coated fabric on a calender roll comprising a stationary support, a pair of spaced substantially upright pivots carried by said support, two substantially parallel links, each connected to one of said upright pivots by a substantially horizontal pivot, a head carried by the free ends of said links and connected to said links by substantially upright pivots that are spaced apart the same distance as the upright pivots of said support so as to hold the links in parallelism, and a trimmer blade attached to said head and adapted to be held by gravity against said roll, said blade being disposed substantially parallel to the fabric edge.

5. A device for trimming excess rubber from an endwise traveling strip of rubber coated fabric carried upon the upper portion of a calender roll comprising a shaft parallel with the roll and adjacent the upper portion of the roll on the side thereof toward which the top of the roll is moving, a supporting member mounted on said shaft for adjustment longitudinally thereof, two links connected to said supporting member to swing vertically and horizontally, a head pivotally connected to the free ends of said links to maintain the links in substantial parallelism, and a trimmer blade attached to said head and positioned substantially at right angles to the axis of the calender roll.

6. A device for trimming excess rubber from an endwise traveling strip of rubber coated fabric carried upon the upper portion of a calender roll comprising a shaft parallel with the roll and adjacent the upper portion of the roll on the side thereof toward which the top of the roll is moving, a supporting member mounted on said shaft for adjustment longitudinally thereof, two spaced pivot members on said supporting member mounted to turn about substantially upright axes, a link pivoted to each of said pivot members to swing about a substantially horizontal axis, a head, substantially upright pivots connecting said links to said head, the latter pivots being at substantially equal distances from said upright axes and the same distance apart as said upright axes, and a trimmer blade fixed to said head and disposed with its cutting edge in a plane substantially at right angles to the axis of the calender roll.

7. An edge trimmer comprising a support, a frame pivotally attached to said support to swing vertically, said frame comprising a pair of links mounted to swing about substantially upright axes and a head carried by the free ends of said links, substantially upright pivots connecting the head to said links, said pivots being at substantially equal distances from said upright axes and the same distance apart as said upright axes, and a trimmer blade attached to said head.

8. An edge trimmer comprising a support, two spaced pivot members mounted on said support to turn about substantially vertical axes, a link pivoted to each of said members to swing about a substantially horizontal axis, a head carried by said links at their free ends, substantially upright pivots connecting said head to said links at substantially equal distances from said vertical axes, and a trimmer blade attached to said head.

9. An edge trimmer comprising a support, two spaced pivot members mounted on said support to turn about substantially vertical axes, a link pivoted to each of said members to swing about a substantially horizontal axis, a head carried by said links at their free ends, substantially upright pivots connecting said head to said links, means for varying the effective length of one of said links, and a trimmer blade attached to said head.

10. An edge trimmer comprising a support, a frame pivotally attached to said support to swing vertically and comprising a pair of parallel links mounted to swing about upright axes, a head carried by the free ends of the links and connected thereto by upright pivots at substantially equal distances from said axes, a cutter carried by the head and a spring yieldably resisting lateral swinging movements of said frame.

NICHOLAS MONG.